US006723677B1

(12) United States Patent
Estrada et al.

(10) Patent No.: US 6,723,677 B1
(45) Date of Patent: Apr. 20, 2004

(54) HIGH ACTIVITY ZIEGLER-NATTA CATALYST FOR HIGH MOLECULAR WEIGHT POLYOLEFINS

(75) Inventors: Jesus Vela Estrada, Calgary (CA); Vaclav George Zboril, Calgary (CA)

(73) Assignee: Nova Chemicals (International) S.A. (CH)

( * ) Notice: Subject to any disclaimer, the term of this patent is extended or adjusted under 35 U.S.C. 154(b) by 229 days.

(21) Appl. No.: 09/891,632

(22) Filed: Jun. 25, 2001

(51) Int. Cl.[7] .............................. B01J 31/14; B01J 31/02
(52) U.S. Cl. ....................... 502/119; 502/113; 502/103; 502/115; 502/104; 526/348; 526/144; 526/137; 526/123.1; 526/124.1; 526/124.2; 526/124.3
(58) Field of Search ................................ 502/113, 103, 502/119, 115, 104; 526/348, 144, 137, 123.1, 124.1, 124.2, 124.3

(56) References Cited

U.S. PATENT DOCUMENTS 5,492,876 A    2/1996   Gillis et al. ................. 502/113
5,589,555 A    12/1996  Zboril et al. .................. 526/64

FOREIGN PATENT DOCUMENTS

| CA | 660869 | 4/1963 |
| CA | 703704 | 2/1965 |
| EP | 0 606 289 A1 | 7/1994 |
| EP | 0 606 289 B1 * | 5/1997 |

* cited by examiner

Primary Examiner—Ling-Siu Choi
(74) Attorney, Agent, or Firm—Kenneth H. Johnson

(57) ABSTRACT

By controlling the hold up times, concentrations and temperatures for mixing the components of aluminum, titanium and magnesium based catalyst for solution polymerization it is possible to prepare a catalyst having a high activity, which prepares high molecular weight polyolefins. Generally, a catalyst loses activity and produces lower molecular weight polymer at higher temperatures. The catalyst of the present invention permits comparable polymers to be produced with higher catalyst activity and at higher reaction temperatures by increasing the concentration of the components used during the preparation of the catalyst.

20 Claims, No Drawings

HIGH ACTIVITY ZIEGLER-NATTA CATALYST FOR HIGH MOLECULAR WEIGHT POLYOLEFINS

FIELD OF THE INVENTION

The present invention relates to a process for preparing Ziegler-Natta catalyst systems, which also contain magnesium. The resulting catalyst is useful in a solution polymerization process and for the preparation of polymers of ethylene, especially homopolymers of ethylene and copolymers of ethylene and higher alpha-olefins. In particular, the invention relates to a method of sequentially reacting the components used to make the catalyst using specific holding times, concentrations and temperature conditions to control the activity of the catalyst and the structural properties of the polymers prepared. Catalyst concentration was not considered in the prior art an important variable for controlling the catalyst activity and polymer properties.

BACKGROUND OF THE INVENTION

Polymers of ethylene, for example, homopolymers of ethylene and copolymers of ethylene and higher alpha-olefins, are used in large volumes for a wide variety of end-uses, for example, in the form of film, fibers, molded or thermoformed articles, pipe, pipe coating and the like. There are two types of processes for the manufacture of polyethylene that involve the polymerization of monomers in an inert liquid medium in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent 660,869 of A. W. Anderson, E. L. Fallwell and J. M. Bruce, which issued Apr. 9, 1963. In a solution process, the process is operated so that both the monomers and polymer are soluble in the reaction medium.

European Patent 0 606 289 B1 granted May 28, 1997 to Zboril describes three procedures for preparing catalyst for solution polymerization process. The difference among the three procedures was the addition sequence of the initial reagents to form the first catalyst component, which is the result of the reaction of magnesium alkyl, first aluminum alkyl, reactive chloride and titanium compound. The second component is formed from the reaction between a second aluminum alkyl and an alcohol. The combination of the first and second components is the final step of the three procedures; however, no claim on catalyst concentration was made in any of the three procedures. In fact it was stated on page 4 at lines 54 through 58 and on page 5 at line 1 that the concentration of the components of the solutions used in the preparation of the catalyst is not critical.

U.S. Pat. No. 5,589,555 issued Dec. 31, 1996 to Zboril et al. describes a process for controlling a solution polymerization process by controlling the composition of the aluminum alkoxy alkyl used in activating the catalyst. The catalyst is prepared reacting a mixture of a dialkyl magnesium compound and a first aluminum compound with a reactive halide and titanium tetrachloride and optionally a vanadium oxytrihalide to make a first component. The resulting mixture is then reacted with a mixture of a second aluminum alkyl compound. The patent does not teach or suggest heating of the reaction product of the first three components to elevated temperatures from 120° C. to 180° C. before adding a second aluminum component.

The specification teaches at column 2 lines 54 through 64 that, optionally the first component may be prepared by reacting (i) the first aluminum alkyl compound, and (ii) the titanium tetrachloride containing optionally vanadium oxytrihalide at temperature of less than 30° C. and heating the resultant admixture to at temperature of 150–300° C. for a period of 5 seconds to 60 minutes before adding (iii) second aluminum alkyl. No magnesium compound is used in this option and the catalyst concentration is considered to be not critical.

U.S. Pat. No. 5,492,876 issued Feb. 20, 1996 to Gillis et al. teaches a process to prepare a catalyst comprising mixing in an inert organic solvent, aluminum compound of the formula $AIR_nX_{3-n}$ where R is a $C_{1-20}$ alkyl, cycloalkyl and aryl radical, X is a halogen and n is 1, 2 or 3; with titanium tetrahalide and vanadium oxytrihalide and heating the resulting solution to a temperature from 180° C. to 250° C. for a time from 15 seconds to 5 minutes and cooling the resulting solution to a temperature of less than 100° C. and adding second vanadium oxytrihalide compound to the cooled mixture and then activating the mixture with an additional aluminum compound, preferably an aluminoxane. The present invention does not contemplate the addition of a vanadium oxytrihalide nor does it contemplate the cooling step. Additionally the reference does not teach the presence of a magnesium compound and the use of catalyst concentration as a variable to control catalyst activity and polymer properties.

Typically in the solution polymerization of ethylene catalyst tends to produce lower molecular weight polymer (which is indicated by a higher melt index) and lose activity at high temperatures. Also in producing ethylene copolymers it is desirable to have more and more uniformly distributed co-monomer incorporation which is reflected by a lower density. It is desirable to find a catalyst having a high activity without significantly reducing the molecular weight of the polymer. The present invention seeks to provide such a catalyst.

SUMMARY OF THE INVENTION

The present invention provides a process for preparing an olefin polymerization catalyst comprising. sequentially mixing:

(i) a mixture of a compound of the formula $(R^1)_2Mg$ where in $R^1$ is selected from the group consisting of $C_{1-6}$ alkyl radicals and a compound of the formula $Al^1(R^2)_3$ wherein $R^2$ is selected from the group consisting of $C_{1-6}$ alkyl radicals; and HCl or a reactive organic chloride for example but not limited to $R^3Cl$ wherein $R^3$ is selected from the group consisting of $C_{1-6}$ alkyl radicals and $C_{6-12}$ aromatic radicals; and maintaining the resulting mixture at a temperature from 25° C. to 80° C., preferably 40° C. to 60° C. for a period from 60 to 150 seconds, preferably 90 to 120 seconds, at the concentration of $R^3Cl$ adjusted to obtain the desired polymer properties and catalyst performance; depending on the equipment it is between 5 to 100 mmol/L, preferably between 8 and 70 mmol/L; then (ii) adding a titanium compound of the formula $(R^4)_aTiCl_{b-a}$ wherein $R^4$ is a $C_{1-6}$ alkoxy radical and a and b are integers from 0 to 4 and the sum of a+b is 4 and holding the mixture for a time from 20 to 90 seconds, preferably from 30 to 50 seconds at a temperature from 25° C. to 80° C., preferably 40° C. to 60° C., at the concentration of $(R^4)_aTiCl_{b-a}$ adjusted to obtain the desired polymer properties and catalyst performance;

depending on the equipment it is between 0.1 to 10 mmol/L, preferably between 0.1 and 5 mmol/L, most preferably between 0.5 and 5 mmol/L; and (iii) adding a compound of the formula $(R^5)_2Al^2(R^6)$ wherein $R^5$ is a $C_{1-6}$ alkyl radical and $R^6$ is a $C_{1-6}$ alkoxy radical and holding the resulting mixture at a temperature from 25° C. to 80° C., preferably 40° C. to 60° C. for a period of time from 5 to 30 seconds, preferably from 3 to 15 seconds. The concentration of $(R^5)_2Al^2(R^6)$ is not critical and is primarily governed by practical considerations.

The components are added in amounts to provide: an atomic ratio of Mg:Al$_1$ is from 3:1 to 8:1, most preferably about 4.5:1; the atomic ratio of Cl:Mg is from 1.5:1 to 2.5:1, most preferably about 2:1; the atomic ratio of Al$_1$:Ti is from 0.5:1 to 1.5:1, most preferably 0.8:1 to 1.5:1; the atomic ratio of Mg:Ti is from 3:1 to 8:1, preferably from 4:1 to 8:1, most preferably from 4:1 to 6:1; and the atomic ratio of Al$^2$:Ti is from 0.5:1 to 2:1, most preferably from 0.75:1 to 1.5:1.

The present invention also provides a process for the solution polymerization of from 80 to 100% of ethylene with from 0 to 20 weight % of one or more $C_{3-8}$ alpha-olefins at a temperature from 105° C. to 200° C. but not limited to, in the presence of a catalyst prepared as described above.

BEST MODE

The present invention is directed to a process for the preparation of high molecular weight polymers of alpha-olefins, such polymers being intended for fabrication into articles by extrusion, injection molding, thermoforming, rotational molding and the like. In particular, the polymers of alpha-olefins are homopolymers of ethylene and copolymers of ethylene and higher alpha-olefins i.e. alpha-olefins especially such higher alpha-olefins having 3 to 12 carbon atoms (i.e. $C_{3-12}$ alpha-olefins), preferably having from 3 to 8 carbon atoms, examples of which are 1-butene, 1-hexene and 1-octene. The preferred higher alpha-olefins have 4 to 10 carbon atoms. Optionally, cyclic endomethylenic dienes may be copolymerized with the ethylene and $C_{3-12}$ alpha-olefins. Such polymers are known.

In the polymerization process using the catalyst of the present invention, inert hydrocarbon solvent, and optionally hydrogen for control of the polymer molecular weight, are fed to a reactor system together with monomers dissolved in the solvent. The monomer may be ethylene or mixtures of ethylene and at least one $C_{3-12}$ higher alpha-olefin, preferably ethylene or mixtures of ethylene and at least one $C_{4-10}$ higher alpha-olefin.

In accordance with the present invention the catalyst is prepared by using the sequence of addition and the heating and holding conditions described above.

In the process of the present invention in step (i) the components are a mixture of a dialkyl magnesium compound and a trialkyl aluminum compound and a halide, preferably an organic halide, most preferably a chloride.

In the process for preparing the catalysts of the present invention alkyl substituents $R^1$, $R^2$, $R^3$ and $R^5$ are preferably selected from the group consisting of $C_{1-4}$ alkyl radical radicals. Such radicals include methyl, ethyl, propyl and primary, secondary and t-butyl radicals. Preferably each $R^1$ is independently selected from the group consisting of ethyl and butyl, most preferably butyl radicals. Preferably $R^2$ are methyl or ethyl radicals. Preferably $R^3$ is a t-butyl radical. Preferably $R^5$ is an ethyl radical.

In the process for preparing the catalysts of the present invention alkyl substituent $R^3$ is preferably selected from the group consisting of $C_{1-4}$ alkyl radicals and a benzyl radical. Such radicals include methyl, ethyl, propyl and primary, secondary and t-butyl radicals. Preferably $R^3$ is a t-butyl radical.

In the process of the present invention $R^4$ of the titanium compound used in step (ii) and $R^6$ of the aluminum compound used in step (iii) are preferably selected from the group consisting of $C_{1-4}$ alkoxy radicals. Such radicals include methoxy, ethoxy, propoxy and butoxy radicals. Most preferably $R^6$ is an ethoxy radical.

In the process for preparing the catalyst of the present invention in the titanium compound used in step (ii) a is preferably 0 and the compound is a titanium tetrahalide, most preferably titanium tetrachloride (i.e. $TiCl_4$).

The catalyst components are mixed at a temperature from 25° C. to 80° C., preferably 40° C. to 60° C. The temperature of mixing may be controlled by the use of a jacketed reactor. The jacket may be used to provide or remove heat. The mixing may take place in a continuous stirred tank reactor (CSTR) or in a tubular reactor preferably having an internal mixing system such as an agitator or static mixers. If a tubular reactor is used the mixing may be achieved by operating under turbulent flow conditions. The hold up times may be controlled by the ratio of the rate of flow through the reactor and the length of the reactor. The concentration of each catalyst component in the admixture is controlled by the concentration of the catalyst solution from which the catalyst component is drawn and the flows of solvent and catalyst solution before they are mixed.

In a preferred embodiment of the present invention, in step (i) the hold up time before adding the titanium compound is for a period from 60 to 150 seconds, preferably 90 to 120 seconds, most preferably from 110 to 115 seconds. The mixture of components is held at a temperature from 25° C. to 80° C., preferably 40° C. to 60° C. during the hold up time. The concentration of chlorine in the admixture is adjusted to obtain the desired polymer properties and catalyst performance. Depending on the equipment (i.e. in some equipment it may not be practical to approach the lower concentration limit - this is permissible provided the upper limit is not exceeded) it is from 5 to 100 mmol/L, preferably from 8 to 70 mmol/L.

Preferably in step (ii) of the present invention the temperature is from 25° C. to 80° C., most preferably from 40° C. to 60° C. and the hold up time before adding the next component is from 20 to 90 seconds, preferably from 30 to 50 seconds; most preferably from 40 to 45 seconds. The concentration of titanium in the resulting mixture is adjusted to obtain the desired properties and catalyst performance. Depending on the equipment (i.e. in some equipment it may not be practical to approach the lower concentration limit— this is permissible provided the upper limit is not exceeded) it is from 0.1 to 10 mmol/L, preferably from 0.1 to 5 mmol/L, most preferably from 0.5 to 5 mmol/L.

In step (iii) of the present invention the temperature is from 25° C. to 80° C., most preferably from 40° C. to 60° C., and the hold up time from 3 to 30 seconds, preferably from 3 to 15 seconds, most preferably from 3 to 10 seconds. The concentration of $(R^5)_2Al^2(R^6)$ is not critical and is primarily governed by practical considerations.

In a preferred embodiment of the present invention the atomic ratio of Mg:Al$^1$ is from 3:1 to 8:1, most preferably 4:1 to 6:1; the atomic ratio of of Cl:Mg is from 1.5:1 to 2.5:1, most preferably 1.8:1 to 2.2:1; the atomic ratio of A$^1$:Ti is from 0.5:1 to 1.5:1, most preferably 0.8:1 to 1.5:1; the atomic ratio of Mg:Ti is from 3:1 to 8:1, preferably 4:1 to 8:1, most preferably 4:1 to 6:1; and the atomic ratio of $Al^2$:Ti is from 0.5:1 to 2:1, most preferably from 0.75:1 to 1.5:1.

The process for preparing the catalyst may be conducted in a tubular reactor or in a series of continuous stirred tank reactors (CSTR) which are typically jacketed to control the temperature. The output from the tubular reactor or the last CSTR feeds into the polymerization reactor.

The concentrations of the components of the solutions used in the preparation of the catalyst are critical except the concentration of $(R^5)_2Al2(R^6)$, which is not critical and is primarily governed by practical considerations.

As exemplified hereinafter, the sequence of steps, temperature, hold up times and catalysts concentrations in the preparation of the catalyst are important in obtaining a catalyst with high activity. The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The catalyst described herein is used in the process of the present invention without separation of any of the components of the catalyst. In particular, neither liquid nor solid fractions are separated from the catalyst before it is fed to the reactor. In addition, the catalyst components are not slurries. All the components are easy-to-handle, storage stable liquids.

The catalyst described herein may be used according to the process of the present invention, over the wide range of temperatures that may be used in an alpha-olefin polymerization process operated under solution conditions. For example, such polymerization temperatures may be in but not limited to the range of 105° C. to 200° C. and especially in the range of 130° C. to 180° C. The polymerization process may be conducted in a reactor system such as in a tubular reactor or multi-reactor system.

The pressures used in the process of the present invention are those known for solution polymerization processes, for example, pressures in the range of about 4–20 MPa.

In the polymerization process of the present invention, the alpha-olefin monomers are polymerized in the reactor in the presence of the catalyst. Pressure and temperature are controlled so that the polymer formed remains in solution.

Optionally, small amounts of hydrogen, for example 1–40 parts per million by weight, based on the total solution fed to the reactor may be added to one or more of the feed streams of the reactor system in order to improve control of the melt index and/or molecular weight distribution and thus aid in the production of a more desirable product, as is disclosed in Canadian Patent 703,704.

The solution passing from the polymerization reactor is normally treated to deactivate any catalyst remaining in the solution. A variety of catalyst deactivators are known, examples of which include but not limited to fatty acids, alkaline earth metal salts of aliphatic carboxylic acids and alcohols. The hydrocarbon solvent used for the deactivator is preferably the same as the solvent used in the polymerization process. If a different solvent is used, it must be compatible with the solvent used in the polymerization mixture and not cause adverse effects on the solvent recovery system associated with the polymerization process.

After deactivation of the catalyst, the solution containing polymer may be passed through a bed of activated alumina or bauxite, which removes part, or all of the deactivated catalyst residues. In a preferred embodiment, the polymerization is conducted without removal of deactivated catalyst residues. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer color. The treatment may be carried out for about 1 to 16 hours, following which the polymer may be dried and cooled with a stream of air for 1 to 4 hours.

Pigments, antioxidants, UV screeners, hindered amine light stabilizers and other additives may be added to the polymer either before or after the polymer is initially formed into pellets or other comminuted shapes. The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range of 0.1:1 to 5:1 with the total amount of antioxidant being in the range of 200 to 3000 ppm.

The polymerization process of the present invention may be used to prepare homopolymers of ethylene and copolymers of ethylene and higher alpha-olefins having densities in the range of, for example, about 0.900–0.970 g/cm$^3$ and especially 0.910–0.930 g/cm$^3$. Such polymers may have a melt index, as measured by the method of ASTM D-1238, condition E, in the range of, for example, about 0.1–200 dg/min, and especially in the range of about 30–45 dg/min. Such a melt index tends to indicate a higher molecular weight of the resulting polymer. The polymers may be manufactured with narrow or broad molecular weight distribution. For example, the polymers may have a stress exponent, a measure of molecular weight distribution, in the range of about 1.1–2.5 and especially in the range of about 1.3–2.0. The process of the invention is believed to be particularly useful in the manufacture of broad molecular distribution polymers.

Stress exponent is determined by measuring the throughput of a melt indexer at two stresses (2160 g and 6480 g loading) using the procedures of the ASTM melt index test method, and the following formula:

$$\text{Stress exponent} = 1/0.477 \times \log(\text{wt. of polymer extruded with 6480 g wt.})/(\text{wt. of polymer extruded with 2160 g wt.})$$

Stress exponent values of less than about 1.40 indicate narrow molecular weight distribution while values above about 1.70 indicate broad molecular weight distribution.

The polymers prepared using the catalyst of the present invention tend to have a higher molecular weight than those prepared using the catalysts of the prior art using comparable polymerization conditions. In the alternative, the catalyst of the present invention may be used at higher polymerization temperatures to produce polymers having comparable molecular weights to those produced using prior art catalysts.

The catalysts of the present invention have improved activity over prior Mg/Al/Ti catalysts and particularly those used in solution process at temperatures between but not limited to 105° C. and 200° C. In a CSTR the catalyst activity is defined as:

$$(KP)(HUT) = (Q/(1-Q))(1/\text{Catalyst Concentration})$$

wherein Q is the fraction of ethylene monomer converted;
HUT is a reciprocal space velocity (hold up time) in the polymerization reactor expressed in minutes and maintained constant throughout the experimental program; and the catalyst concentration is the concentration in the polymerization reactor expressed in mmol of Ti/L.

The polymers produced by the process of the present invention are capable of being fabricated into a wide variety of articles, as is known for homopolymers of ethylene and copolymers of ethylene and higher alpha-olefins.

The process of the present invention is believed to be particularly advantageous in the preparation of broad molecular weight distribution polymers using an adiabatic tubular reactor, or a series of reactors.

EXAMPLES

The present invention will be illustrated by the following non-limiting examples in which unless otherwise indicated weight is in grams and concentration is by weight. The ratios for catalyst components are atomic ratios and the concentrations are in mmol/L.

Reactor Set Up

The polymerization reactor was a solution reactor, which is a 81 ml free-volume (regular internal shape, with the approximate dimensions of 15×90 mm) pressure vessel fitted with six regularly spaced internal baffles. The vessel was fitted with a six-blade turbine-type impeller, a heating jacket, pressure and temperature controllers, three feed lines and a single outlet. The feed lines were located on the top of the vessel, each at a radial distance of 40 mm from the axis, while the outlet line was axial with the agitator shaft. A reactor of 20 ml, which is a scale down version of the 81 ml reactor, was also employed. Reactors of different size were used to be able to achieve the same reactor hold-up time and same catalyst flows to the reactor, hence same catalyst hold-up time when the catalyst concentration was changed. The catalyst components and the monomers were dissolved or dispersed in cyclohexane, which had been purified by being passed through beds of activated alumina, molecular sieves and silica gel prior to being stripped with nitrogen.

In the following experiments the catalyst was prepared in an in-line mixer feeding into the stirred tank polymerization reactor described above. The in-line mixer comprised a tube with heating jackets and a number of inlets. The temperature and mixing time of the reactants fed to the inline mixer could be controlled. The hold up time in the stirred tank polymerization reactor was short (1.17 minutes) and the solution of product was continuously withdrawn from the reactor and the resulting polyethylene co- or homopolymer was recovered and analyzed.

The catalyst flow rates were controlled to provide milimolar ratios of the components as specified below. Similarly, the concentrations of the catalyst solutions from which the components are fed to the reactor were also controlled. The catalyst comprised the following components. The first component was a mixture of butyl ethyl magnesium (BEM), triethyl aluminum (TEAL) and t-butyl chloride (Cl) to provide the molar ratios and the catalyst concentrations set out below. The hold up time (in seconds) for mixing the first components (HUT1) was controlled and the mixing temperature (T1) in degrees Celsius was also controlled. The second component added to the catalyst was $TiCl_4$ (Ti) at the rate for achieving the molar ratios and the concentrations indicated below. The hold up time (in seconds) for mixing the first and second component (HUT2) was controlled and the mixing temperature (T2) in degrees Celsius was also controlled. The third component added to the catalyst was diethyl aluminum ethoxide (DEALOET). The third catalyst component was added in line; the hold up time in seconds (HUT3) and the temperature in degrees Celsius (T3) were controlled.

The monomer(s) were dissolved in the solvent at about 3 weight % and the 1-octene co-monomer used was present in about 50 weight percent of the ethylene weight.

The resulting polymers were tested for a number of properties. The density of the polymers was determined using ASTM D-792. The melt index was measured by the method of ASTM D-1238, condition E. Stress Exponent (S.Ex.) is measured as described above.

The conversion of the reaction was determined and the activity of the catalyst was also determined. The conversion was calculated from the ethylene flow fed to the reactor and from the unreacted ethylene (measured with a Gas Chromatograph) present in the polymer solution that was continuously withdrawn from the reactor.

Control Experiments

For the control experiments the molar ratios of catalyst components and hold up times were as follows: $Mg/Al^1$=4.1; Cl/Mg=2; $Al^1/Ti$=1.0; $Al^2/Ti$=1.0; HUT1=113 seconds; HUT2=42 seconds; HUT3=3.6 second. The concentrations of titanium tetrachloride and t-butyl chloride in the catalyst lines were 0.33 and 4.1 mmol/L respectively. No hydrogen was added to the reactor, and the reactor temperature was set at 170° C.

Example 1

Polyethylene copolymer was prepared. The titanium tetrachloride and t-butyl chloride concentrations were 0.8 and 12 mmol/L respectively. The catalyst ratios and hold up times are the same as the ones indicated above for the control experiments. Similarly, the reactor temperature was set at the same value used for the control experiments and no hydrogen was added to the reactor.

For different catalyst temperatures and concentrations the activity of the catalyst was determined using the formula set out above. The results are set forth in Table 1.

TABLE 1

| | Catalyst Activity (KP*HUT), [L/mmol] | |
| --- | --- | --- |
| T1 = T2 = T3 (° C.) | Control Ti = 0.33 mmol/L Cl = 4.1 mmol/L | Ti = 0.8 mmol/L Cl = 12 mmol/L |
| 35 | — | 407.1 |
| 40 | — | 441.0 |
| 45 | 256.3 | 427.1 |
| 50 | 330.4 | 409.4 |
| 55 | 278.7 | 343.9 |

By increasing the catalyst concentration and temperature, the catalyst activity increases. However, the catalyst activity reaches a maximum with temperature, then decreases as the temperature increases.

Example 2

The resulting polymer produced in experiments of example 1 was recovered and its Melt Index (Ml) was determined. The results are set forth in Table 2.

TABLE 2

| | MI [dg/min] | |
|---|---|---|
| T1 = T2 = T3 (° C.) | Control Ti = 0.33 mmol/L Cl = 4.1 mmol/L | Ti = 0.8 mmol/L Cl = 12 mmol/L |
| 35 | — | 2.389 |
| 40 | — | 2.408 |
| 45 | 1.538 | 2.217 |
| 50 | 1.285 | 1.823 |
| 55 | 2.858 | 2.648 |

By increasing temperature the Ml reaches a minimum, then increasing as the temperature increases. The optimal temperature is not catalyst concentration dependent; however, the Ml increases slightly with catalyst concentration.

Example 3

The resulting polymer produced in experiments of example 1 was recovered and its Stress Exponent (S.Ex.) was determined. The results are set forth Table 3.

TABLE 3

| | S.Ex. | |
|---|---|---|
| T1 = T2 = T3 (° C.) | Control Ti = 0.33 mmol/L Cl = 4.1 mmol/L | Ti = 0.8 mmol/L Cl = 12 mmol/L |
| 35 | — | 1.423 |
| 40 | — | 1.393 |
| 45 | 1.423 | 1.405 |
| 50 | 1.375 | 1.360 |
| 55 | 1.410 | 1.371 |

By increasing temperature the S.Ex. reaches a minimum, then increases as the temperature increase. The optimal temperature is not catalyst concentration dependant; however, the S.Ex. decreases with catalyst concentration.

Example 4

The resulting polymer produced in experiments of example 1 was recovered and its Density was determined. The results are set forth in Table 4.

TABLE 4

| | Density [g/cc] | |
|---|---|---|
| T1 = T2 = T3 (° C.) | Control Ti = 0.33 mmol/L Cl = 4.1 mmol/L | Ti = 0.8 mmol/L Cl = 12 mmol/L |
| 35 | — | 0.9276 |
| 40 | — | 0.9277 |
| 45 | 0.9348 | 0.9245 |
| 50 | 0.9334 | 0.9182 |
| 55 | 0.9351 | 0.9179 |

By increasing temperature the density reaches a minimum and the magnitude of the density drop is catalyst concentration dependent. The density is lower at higher catalyst concentrations.

What is claimed is:

1. A process for preparing an olefin polymerization catalyst comprising sequentially mixing:
   (i) a mixture of a compound of the formula $(R^1)_2Mg$ where in $R^1$ is selected from the group consisting of $C_{1-6}$ alkyl radicals and a compound of the formula $Al^1(R^2)_3$ wherein $R^2$ is selected from the group consisting of $C_{1-6}$ alkyl radicals; and HCl or a reactive organic chloride of the formula $R^3Cl$ wherein $R^3$ is selected from the group consisting of $C_{1-6}$ alkyl radicals and $C_{6-12}$ aromatic radicals; and maintaining the resulting mixture at a temperature from 40° C. to 60° C. for a period from 60 to 150 seconds at a concentration of $R^3Cl$ from 5 to 100 mmol/L; then
   (ii) adding a titanium compound of the formula $(R^4)_aTiCl_{b-a}$ wherein $R^4$ is a $C_{1-6}$ alkoxy radical and a and b are integers from 0 to 4 and the sum of a+b is 4 to provide a molar ratio of $Mg:Al^1$ from 3:1 to 8:1; a molar ratio of Cl:Mg from 1.5:1 to 2.5:1; a molar ratio of $Al^1$:Ti from 0.5:1 to 1.5:1; and a molar ratio of Mg:Ti from 3:1 to 8:1; and holding the resulting mixture for a time from 20 to 90 seconds at a temperature from 40° C. to 60° C. at a concentration of $(R^4)_aTiCl_{b-a}$ from 0.1 to 10 mmol/L; and
   (iii) adding a compound of the formula $(R^5)_2Al^2(R^6)$ wherein $R^5$ is a $C_{1-6}$ alkyl radical and $R^6$ is a $C_{1-6}$ alkoxy radical and holding the resulting mixture at a temperature from temperature from 40° C. to 60° C. for a period of time from 5 to 30 seconds.

2. A process according to claim 1, wherein in step (i) the halide is an organic halide.

3. The process according to claim 2, wherein $R^1$, $R^2$ and $R^3$ are selected from the group consisting of $C_{1-4}$ alkyl radicals.

4. The process according to claim 3, wherein $R^5$ is selected from the group consisting of $C_{1-4}$ alkyl radicals and $R^4$ and $R^6$ are selected from the group consisting of $C_{1-4}$ alkoxy radicals.

5. The process according to claims 4, wherein in step (i) the hold up time is from 90 seconds to 120 seconds.

6. The process according to claim 5, wherein in step (ii) the hold up time is from 30 seconds to 50 seconds.

7. The process according to claim 6, wherein in step (iii) the hold up time is from 3 seconds to 15 seconds.

8. The process according to claim 7, wherein in step (i) the chlorine concentration is from 8 to 70 mmol/L.

9. The process according to claim 8, wherein in step (ii) the titanium concentration is from 0.1 to 5 mmol/L.

10. The process according to claim 9, wherein a is 0.

11. The process according to claim 10, wherein $R^1$ is selected from the group consisting of ethyl and butyl radicals.

12. The process according to claim 11, wherein in step (i) the halide is t-butyl halide.

13. The process according to claim 12, wherein all $R^2$ radicals are methyl radical.

14. The process according to claim 13, wherein $R^5$ is an ethyl radical and $R^6$ is an ethoxide radical.

15. The process according to claim 14, wherein in step (ii) the titanium concentration is from 0.5 to 5 mmol/L.

16. The process according to claim 15, wherein the molar ratio of Mg:$Al^1$ is from 4:1 to 6:1.

17. The process according to claim 16, wherein the molar ratio of Cl:Mg is from 1.8:1 to 2.2:1.

18. The process according to claim 17, wherein the molar ratio of $Al^1$:Ti is from 0.8:1 to 1.5:1.

19. The process according to claim 18, wherein the molar ratio of Mg:Ti is from 4:1 to 6:1.

20. The process according to claim 19, wherein the molar ratio of $Al^2$ to Ti is from 0.75:1 to 1.5:2.

* * * * *